(12) United States Patent
Tulloch et al.

(10) Patent No.: US 11,396,901 B2
(45) Date of Patent: Jul. 26, 2022

(54) FASTENER LOCKING

(71) Applicant: AIRBUS OPERATIONS LIMITED, Bristol (GB)

(72) Inventors: William Tulloch, Bristol (GB); Danny Payne, Bristol (GB)

(73) Assignee: Airbus Operations Limited, Bristol (GB)

( * ) Notice: Subject to any disclaimer, the term of this patent is extended or adjusted under 35 U.S.C. 154(b) by 238 days.

(21) Appl. No.: 16/701,674

(22) Filed: Dec. 3, 2019

(65) Prior Publication Data

US 2020/0173486 A1 Jun. 4, 2020

(30) Foreign Application Priority Data

Dec. 3, 2018 (GB) ...................................... 1819661

(51) Int. Cl.
*F16B 39/02* (2006.01)
*F16B 39/10* (2006.01)
*F16B 41/00* (2006.01)

(52) U.S. Cl.
CPC .......... *F16B 39/101* (2013.01); *F16B 41/002* (2013.01)

(58) Field of Classification Search
CPC .............................. F16B 39/101; F16B 39/108
USPC ....... 411/87, 88, 90, 92–94, 96, 98, 99, 102, 411/119; 70/229, 230, 232
See application file for complete search history.

(56) References Cited

U.S. PATENT DOCUMENTS

| | | | |
|---|---|---|---|
| 1,015,316 A | | 1/1912 | Huber |
| 1,084,566 A | * | 1/1914 | Streitelmeier .......... F16B 39/10 411/119 |
| 1,379,607 A | * | 5/1921 | Chauncey ............... F16B 39/20 411/87 |
| 1,741,077 A | * | 12/1929 | Rusack ................... F16B 39/10 411/91 |

(Continued)

FOREIGN PATENT DOCUMENTS

| | | |
|---|---|---|
| DE | 2519695 | 11/1976 |
| DE | 27 24 333 | 11/1978 |

(Continued)

OTHER PUBLICATIONS

Combined Search and Examination Report for GB1819661.8, dated May 31, 2019, 5 pages.

(Continued)

*Primary Examiner* — Gary W Estremsky
(74) *Attorney, Agent, or Firm* — Nixon & Vanderhye P.C.

(57) ABSTRACT

A locking apparatus for locking the rotational position of a fastener component which is rotatable about an axis relative to a structure. The locking apparatus includes a collar and a rigid arm. The collar is configured to engage with the fastener component such that relative rotation of the collar and the fastener component is substantially prevented. The arm has a first end configured to engage with the collar such that rotation of the collar relative to the first end is substantially prevented, and a second end configured to engage with the structure such that rotation of the arm relative to the structure is substantially prevented. The collar has an inner surface having a first finite order of rotational symmetry about the axis, and an outer surface having a second, larger, finite order of rotational symmetry about the axis.

14 Claims, 6 Drawing Sheets

(56) References Cited

U.S. PATENT DOCUMENTS

| | | | | |
|---|---|---|---|---|
| 2,626,837 A | * | 1/1953 | Wilson | B60B 3/16 301/35.624 |
| 4,542,869 A | * | 9/1985 | Brine | B64C 9/16 244/216 |
| 4,737,057 A | | 4/1988 | Olsson | |
| 4,995,575 A | * | 2/1991 | Stephenson | B64C 9/16 244/216 |
| 5,415,509 A | * | 5/1995 | Martin | F16D 1/06 403/315 |
| 5,651,513 A | * | 7/1997 | Arena | B64C 9/16 244/99.3 |
| 5,674,034 A | * | 10/1997 | Bennett | F16B 39/10 411/120 |
| 6,158,933 A | * | 12/2000 | Nicholson | F16B 37/14 116/200 |
| 6,439,616 B1 | * | 8/2002 | Karafillis | F01D 9/065 285/205 |
| 10,941,675 B2 | * | 3/2021 | Silva | F16B 39/10 |
| 2009/0148253 A1 | * | 6/2009 | de Groot | F16B 39/22 411/204 |
| 2009/0167074 A1 | * | 7/2009 | De Lima | B60B 7/063 301/35.624 |
| 2010/0008743 A1 | * | 1/2010 | Bawden | F16B 39/10 411/130 |
| 2017/0326910 A1 | * | 11/2017 | Ferman | B60B 3/16 |

FOREIGN PATENT DOCUMENTS

| | | |
|---|---|---|
| EP | 3530966 | 8/2019 |
| FR | 3 021 718 | 12/2015 |
| GB | 2 401 159 | 11/2004 |
| GB | 2 530 735 | 4/2016 |
| GB | 2530735 | 4/2016 |
| GB | 2 535 206 | 8/2016 |
| WO | 2016/081985 | 6/2016 |

OTHER PUBLICATIONS

European Search Report cited in EP 19209937.2 dated Apr. 20, 2020, 9 pages.

* cited by examiner

FASTENER LOCKING

RELATED APPLICATION

This application claims priority to United Kingdom Patent Application GB 1819661.8 filed Dec. 3, 2018, the entire contents of each of which are hereby incorporated by reference.

TECHNICAL FIELD

The present invention relates to a locking apparatus for locking the rotational position of a fastener component which is rotatable about an axis relative to a structure, to a locking assembly comprising such a locking apparatus, and also to a method of locking the rotational position of a fastener component.

BACKGROUND

Rotatable fastener components such as nuts and bolts may loosen when subjected to vibration. Fasteners on vehicles such as aircraft may experience significant vibration during operation of the vehicle, so it is desirable to provide mechanisms for locking the rotational positions of such fasteners. Known locking mechanisms include split pins, which are suitable for locking together two relatively rotatable parts of a fastener (such as a nut and a bolt), and safety wire, which is attached at one end to a rotatable fastener part and at the other end to another part of the fastener or to another structure.

Various drawbacks exist in respect to conventional fastener locking mechanisms. For example, split pins are not generally suitable for locking a fastener component to a further structure, and require a hole to be created through the fastener components that are to be locked together, after the fastener has been installed and tightened. This is difficult or impossible for many fastener arrangements. Safety wire can be used in more situations, but it is impractical for very large, highly loaded fasteners. Moreover, the correct installation of safety wire requires considerable skill, and can be difficult to perform where access to the fastener is restricted.

In view of these drawbacks, an improved fastener locking mechanism is desired.

SUMMARY

A first aspect of the present invention provides a locking apparatus for locking the rotational position of a fastener component which is rotatable about an axis relative to a structure. The locking apparatus comprises a collar and a rigid arm. The collar is configured to engage with the fastener component such that relative rotation of the collar and the fastener component is substantially prevented. The arm has a first end configured to engage with the collar such that rotation of the collar relative to the first end is substantially prevented, and a second end configured to engage with the structure such that rotation of the arm relative to the structure is substantially prevented. The collar has an inner surface having a first finite order of rotational symmetry about the axis, and an outer surface having a second, larger, finite order of rotational symmetry about the axis.

Optionally, the fastener component has a finite order of rotational symmetry about the axis. Optionally, the order of rotational symmetry about the axis of the inner surface of the collar is larger than the order of rotational symmetry about the axis of the fastener component.

Optionally, the inner surface of the collar is configured to mechanically interlock with an outer surface of the fastener component. Optionally, the inner surface of the collar is configured to mechanically interlock with the outer surface of the fastener component in a plurality of rotational positions of the fastener component relative to the collar.

Optionally, the first end of the arm comprises an engagement surface configured to mechanically interlock with the outer surface of the collar in a plurality of rotational positions of the arm relative to the collar. Optionally, the plurality of rotational positions of the arm relative to the collar is greater than the plurality of rotational positions of the collar relative to the fastener component.

Optionally, at least a section of the collar has a non-circular cross-section and/or at least one radially-extending projection, and wherein the first end is configured to at least partially encircle the section of the collar having a non-circular cross-section and/or at least one radially-extending projection.

Optionally, one of the engagement surface of the first end and the outer surface of the collar comprises axial splines oriented substantially parallel to the axis of rotation of the fastener component, which project radially from the surface with respect to the axis of rotation of the fastener component, and the other one of the engagement surface of the first end and the outer surface of the collar comprises axial recesses configured to receive the splines, so that the splines and recesses interlock to prevent relative rotation of the arm and the collar when the arm is engaged with the collar.

Optionally, the second end is configured to be fixedly attachable to the structure in a plurality of rotational positions of the arm relative to the structure.

Optionally, one or both of the collar and the rigid arm has been manufactured using an additive manufacturing process.

A second aspect of the present invention provides a locking assembly comprising a rigid base plate and a locking apparatus according to the first aspect. The base plate is configured to extend between at least a first fastener and a second fastener. The base plate has a first part configured to engage with the first fastener such that relative translational movement of the first part and the first fastener is constrained, and a second part configured to engage with the second fastener such that relative translational movement of the second part and the second fastener is constrained. The fastener component is comprised in the first fastener or the second fastener. The second end of the arm of the locking apparatus is configured to engage with the base plate such that rotation of the arm relative to the base plate is substantially prevented.

Optionally, the first part of the base plate comprises a first opening configured to encircle the first fastener and the second part of the base plate comprises a second opening configured to encircle the second fastener.

Optionally, the base plate further comprises an engagement feature configured to be engageable with the second end of the arm such that relative rotational movement of the second end and the base plate is substantially prevented.

Optionally, the locking assembly is for locking the rotational position of a first fastener component and the rotational position of a second fastener component, each of which is rotatable about an axis relative to a structure. The locking apparatus is configured to lock the rotational position of the first fastener component relative to the base plate. The locking assembly further comprises an additional locking apparatus according to the first aspect and the additional locking apparatus is configured to lock the rotational position of the second fastener component relative to the base plate.

Optionally, the second end of the arm of the locking apparatus and the second end of the arm of the additional locking apparatus are each engageable with a common engagement feature of the base plate.

Optionally, the common engagement feature comprises a fastener configured to extend through the base plate, the second end of the arm of the locking apparatus, and the second end of the arm of the additional locking apparatus.

A third aspect of the present invention provides a kit of parts for forming the locking apparatus according to the first aspect or the locking assembly according to the second aspect.

A fourth aspect of the present invention provides an aircraft assembly comprising a first aircraft structure; a second aircraft structure; and a locking mechanism. The second aircraft structure is fixedly attached to the first aircraft structure by one or more fasteners configured to be installed on the structure by rotating the or each fastener about its axis. The locking mechanism is engaged with at least one of the one or more fasteners, for substantially preventing rotation of at least a part of the fastener relative to the first and second structures. The locking mechanism comprises a locking apparatus according to the first aspect or a locking assembly according to the second aspect.

Optionally, each fastener comprises a nut threadingly engaged with a bolt or a stud, and the locking mechanism is engaged with the nut of the at least one fastener to substantially prevent rotation of the nut relative to the first and second structures.

Optionally, the first aircraft structure is comprised in a fixed trailing edge structure and the second aircraft structure is comprised in a flap support structure.

A fifth aspect of the present invention provides an aircraft comprising the aircraft assembly according to the fourth aspect.

A sixth aspect of the present invention provides a method of locking the rotational position of a rotatable fastener component. The method comprises:
  installing a fastener on at least one structure by rotating the rotatable fastener component relative to the at least one structure until a desired torque is achieved;
  installing a locking collar on the rotatable component by engaging the locking collar with the rotatable component such that relative rotation of the locking collar and rotatable component is substantially prevented;
  selecting a rotational position of a rigid locking arm in which a first end of the locking arm is engageable with the locking collar and a second end of the locking arm is engageable with an engagement feature provided on the at least one structure;
  engaging the first end of the locking arm with the locking collar, in the selected rotational position of the locking arm, such that relative rotation of the locking collar and locking arm is substantially prevented; and
  engaging the second end of the locking arm with the engagement feature, such that relative movement of the second end and the engagement feature is substantially prevented.

Optionally, the first end of the locking arm and the locking collar are mutually configured such that the first end of the locking arm is engageable with the locking collar in a set of discrete rotational positions, and the selected rotational position is comprised in the set of discrete rotational positions.

Optionally, the engagement feature and the second end of the locking arm are mutually configured such that the second end of the locking arm is engageable with the engagement feature in a range of rotational positions of the locking arm relative to the structure, and selecting a rotational position of the locking arm comprises selecting a rotational position comprised in both the set of discrete rotational positions and the range of rotational positions.

BRIEF DESCRIPTION OF THE DRAWINGS

Embodiments of the invention will now be described, by way of example only, with reference to the accompanying drawings, in which:

FIG. 4b is a top view of a structure comprised in the example assembly of FIG. 4a;

FIG. 4c is a top view of a locking assembly comprised in the assembly of FIG. 4a;

FIG. 5b is a perspective view of the example locking assembly of FIG. 5a;

DETAILED DESCRIPTION

The examples described below relate to locking the rotational position of a fastener component which is rotatable about an axis relative to a structure. In each described example the locking is facilitated by a locking apparatus, comprising a collar and a rigid arm. The collar is configured to engage with the rotatable fastener component such that relative rotation of the collar and fastener component is substantially prevented. The rigid arm has a first end configured to engage with the fastener collar such that rotation of the collar relative to the first end is substantially prevented, and a second end configured to engage with the structure such that rotation of the arm relative to the structure is substantially prevented. In each example described herein the collar has an inner surface having a first finite order of rotational symmetry about the axis, and an outer surface having a second, larger, finite order of rotational symmetry about the axis.

In some examples the collar may be considered to be fixedly attached to the fastener component when it is engaged with the fastener component. Similarly, the first end of the arm may be considered to be fixedly attached to the collar when it is engaged with the collar, and the second end of the arm may be considered to be fixedly attached to the structure when it is engaged with the structure. The term "fixedly attached" as used in this specification is intended to mean that relative movement between two fixedly attached components is substantially prevented by the attachment, and does not exclude attachments in which some small degree of relative movement remains possible (e.g. as a result of manufacturing tolerances of the components).

The invention may be particularly advantageous for applications in which it is desired to lock rotatable fastener components of two adjacent or closely-located fasteners. The invention may be particularly advantageous for applications in which it is difficult, impossible, or otherwise undesirable for a fastener locking mechanism to be engaged with a pre-existing structure (that is, a structure which is not part of the locking mechanism), as will become apparent from the description below. Moreover; locking apparatus and locking assemblies according to the invention may be very quick and simple to install, thus facilitating an efficient and cost-effective manufacturing process.

Figure 1:
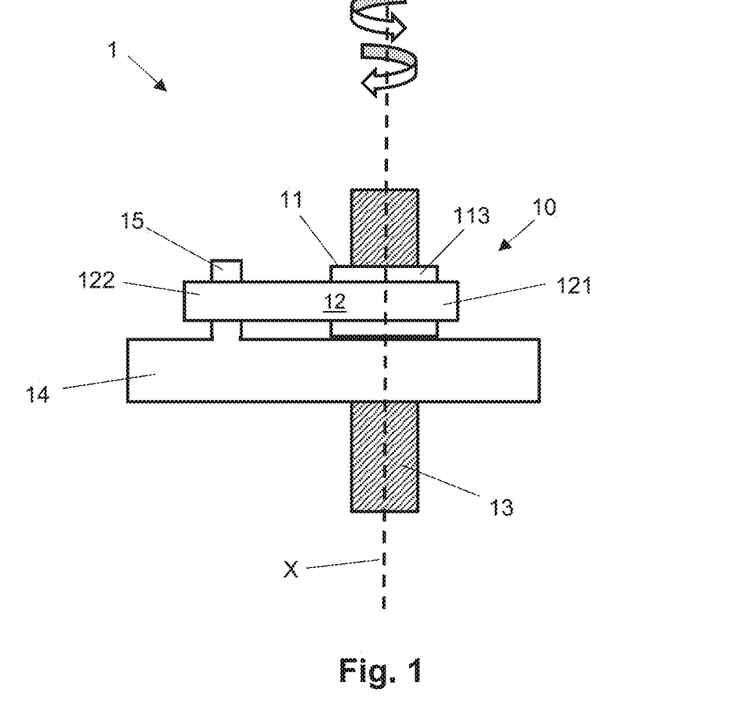
FIG. 1 is a schematic side view of an example assembly according to the invention, comprising a fastener component, a structure, and a locking apparatus for locking the rotational position of the fastener component relative to the structure.

FIG. 1 shows an example assembly 1 comprising a fastener 13 locked in accordance with the invention. A rotatable component of the fastener 13 is rotatable about the axis X. The assembly 1 comprises a locking apparatus 10, which is engaged with the rotatable component of the fastener 13 and also with a structure 14, for substantially preventing rotation of the rotatable part of the fastener 13 relative to the structure 14. The example structure 14 comprises an engagement feature 15 to facilitate engagement of the locking apparatus 10 with the structure 14. In the particular illustrated example, the structure 14 is a structure with which the fastener 13 is engaged (e.g. for the purpose of attaching the structure 14 to a further structure). In other examples the structure 14 with which the locking apparatus 10 is be engaged may be a different structure from any of the structures with which the fastener 13 is engaged. In some examples the structure 14 may be comprised in a locking assembly, as will be described below in relation to FIGS. 4a-d. In some examples the structure 14 may be comprised in an aircraft component. In FIGS. 1-4d, fasteners (and components thereof) are shown with hatching, to make it easier to distinguish which illustrated parts are comprised in a fastener and which are comprised in a surrounding structure or a locking apparatus.

The fastener 13 is configured to resist separation of two or more structures (which may or may not include the structure 14) in the direction parallel to the rotational axis X of the fastener 13. The fastener 13 may be further configured to resist relative movement of the two or more structures in directions perpendicular to the axis X. The fastener 13 may be any type of fastener which is tightenable by rotating the rotatable part of the fastener 13 about the axis X. In some examples the fastener 13 is configured to be tightened by rotating the rotatable part relative to another part of the fastener 13 and/or relative to the structure 14. In other examples the fastener 13 is configured to be tightened by rotating another part of the fastener 13 relative to the rotatable part (in which case the rotatable part may be prevented from rotating during the tightening process). The fastener 13 may be a threaded fastener. The fastener 13 may comprise a nut and bolt, a tension stud, a screw, or the like.

At least the rotatable part of the fastener 13 has a finite order of rotational symmetry about the axis X. In other words, the rotatable part of the fastener 13 has a non-circular cross-section in a plane perpendicular to the axis X, and/or at least one radially-extending projection. This facilitates applying a torque to the rotatable part, for example to enable the fastener 13 to be tightened by rotating the rotatable part (relative to the structure 14 and/or relative to another part of the fastener 13), or by preventing the rotation of the rotatable part as another part of the fastener 13 is rotated.

Figure 2:
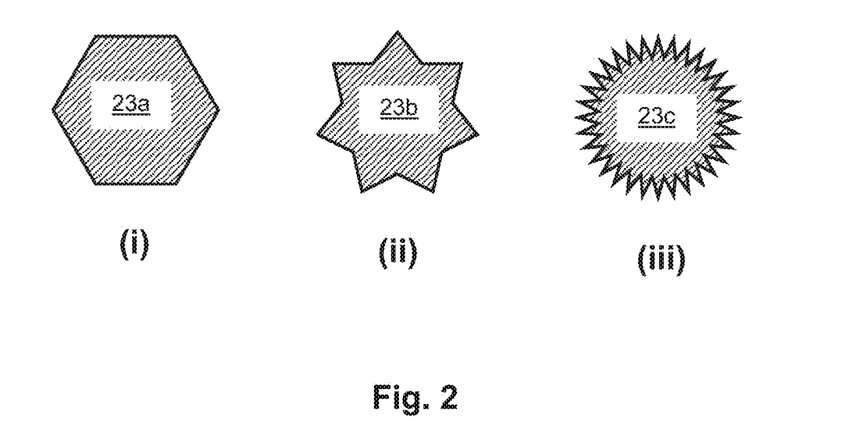
FIG. 2 is a top view of three different example fastener components for the assembly of FIG. 1.

FIG. 2 shows cross-sections through three different example fastener components 23a, 23b and 23c, any of which may be the rotatable component of the fastener 13. Each of the fastener components 23a, 23b, 23c has a finite order of rotational symmetry about the axis X. In particular, the fastener component 23a has a regular hexagonal cross-section and rotational symmetry of order 6; the fastener component 23b has a star-shaped cross-section and rotational symmetry of order 7; and the fastener component 23c has a circular cross-section with 32 equally spaced radially-projecting splines and rotational symmetry of order 32. The splines are oriented substantially parallel to the axis of rotation of the fastener component 23c. Each of the splines may be considered to be a radially-extending projection. The rotatable component of the fastener 13 may equally have any other shape having a finite order of rotational symmetry.

The locking apparatus 10 comprises a collar 11 and a rigid arm 12. The collar has an inner surface (not visible in FIG. 1) and an outer surface 113. The collar is configured to at least partially encircle the rotatable component of the fastener 13. In particular, the collar 11 may be configured to at least partially encircle a section of the rotatable component having a non-circular cross-section and/or at least one radially-extending projection. In the particular example the collar 11 has the form of a sleeve which fully encircles the rotatable component of the fastener 13.

The inner surface of the collar 11 has a non-circular cross-section in a plane perpendicular to the axis X, and/or at least one radially-extending projection or recess. In some examples the configuration of the inner surface corresponds to the configuration of an outer surface (or engagement surface) of the rotatable component of the fastener 13. The inner surface of the collar 11 has a finite order of rotational symmetry about the axis X. In some examples the order of rotational symmetry of the inner surface is equal to the order of rotational symmetry of the rotatable fastener component. In some examples the order of rotational symmetry about the axis X of the inner surface of the collar 11 is larger than the order of rotational symmetry about the axis X of the rotatable fastener component.

The inner surface of the collar 11 is configured to mechanically interlock with the outer surface of the rotatable component of the fastener 13. The mechanical interlock prevents relative rotation, about the axis X, of the collar 11 and the rotatable component. The mechanical interlock may be achieved by inner surface of the collar 11 being shaped to conform to the outer surface of the rotatable component. For example, if the outer surface of the rotatable component of the fastener 13 comprises one or more protrusions, the inner surface of the collar 11 may comprise one or more correspondingly shaped recesses within which the protrusions are received when the collar 11 is engaged with the rotatable component.

The outer surface 113 of the collar 11 also has a non-circular cross-section in a plane perpendicular to the axis X, and/or at least one radially-extending projection or recess. The outer surface 113 has a finite order of rotational symmetry about the axis X that is larger than the order of rotational symmetry about the axis X of the inner surface of the collar 11. The order of rotational symmetry of the outer surface 113 may be significantly larger than the order of rotational symmetry of the inner surface. In some examples the order of rotational symmetry of the outer surface 113 may be at least twice as large as the order of rotational symmetry of the inner surface.

It is advantageous for the outer surface 113 to have a large order of rotational symmetry, because the larger the order of rotational symmetry of the outer surface 113, the larger the number of relative rotational positions in which the arm 12 can be engaged with the collar 11. It is advantageous for the arm 12 to be engageable with the collar 11 in various relative rotational positions of the arm 12 and collar 11 because it is often difficult or impossible to predict which rotational position the rotatable fastener component (and therefore the collar 11) will be in after the fastener 13 has been fully tightened. The mechanism for engaging the second end of the arm 12 with the structure 14 must therefore be able to accommodate a range of possible rotational positions of the arm 12, and this range may generally become smaller as the number of possible relative rotational positions of the arm 12 and collar 11 is increased.

The arm 12 has a first end 121 configured to engage with the collar 11 such that rotation of the collar 11 relative to the first end 121 is substantially prevented, and a second end 122 configured to engage with the structure 14 such that rotation of the second end 122 relative to the structure 14 is substantially prevented. In some examples the first end comprises an engagement surface configured to mechanically interlock with an outer surface of the collar 11. The mechanical interlock prevents relative rotation, about the axis X, of the collar 11 and the arm 12. The mechanical interlock may be achieved by the engagement surface of the first end 121 being shaped to conform to the outer surface 113 of the collar 11. For example, if the outer surface of the collar 11 comprises one or more protrusions, the engagement surface may comprise one or more correspondingly shaped recesses in which the protrusions are received when the first end is engaged with the collar 11. The engagement surface may have a finite order of rotational symmetry that is greater than or equal to the order of rotational symmetry of the outer surface 113 of the collar 11. In some examples the first end 121 is configured to at least partially encircle the collar 11. In particular, the first end 121 may be configured to at least partially encircle a section of the collar 11 having a non-circular cross-section and/or at least one radially-extending projection. In the particular example of FIG. 1, the first end is configured to fully encircle the collar 11.

The engagement surface may be configured to engage with the outer surface 113 of the collar 11 in a plurality of rotational positions of the arm 12 (or a component thereof) relative to the collar 11. The number of different relative rotational positions of the arm 12 (or a component thereof) and the collar 11 in which the engagement surface and outer surface 113 are able to be engaged may be equal to the order of rotational symmetry of the engagement surface of the first end 121. As will be explained further below, it may be necessary for the arm 12 to be engaged with the collar 11 in a rotational position such that the second end 122 of the arm is aligned with the engagement feature 15 of the structure 14 (in order for the second end 122 to be able to engage with the structure 14).

The second end 122 of the arm 12 may be configured to engage with the structure 14 by any suitable mechanism such that relative rotational movement about the axis X of the arm 12 and the structure 14 is substantially prevented. For example, the second end 122 of the arm 12 may be fixedly attached to the structure 14 using one or more fasteners, of any suitable type. Alternatively or additionally, the second end 122 of the arm 12 may be configured to cooperate with an engagement feature (such as the engagement feature 15) provided on the structure 14. In some examples the second end 122 of the arm 12 is configured to mechanically interlock with an engagement feature provided on the structure 14. In some examples the second end 122 of the arm 12 is configured to be fixedly attachable to the structure 14 in a range of rotational positions of the arm 12 relative to the structure 14. In the illustrated example the second end 122 of the arm 12 is configured to engage with the engagement feature 15. The engagement feature 15 comprises a protrusion extending from a surface of the structure, in a direction parallel to the axis X. The second end 122 comprises an opening configured to encircle the protrusion. The opening may be larger than the protrusion, so that the second end 122 is engageable with the engagement feature 15 in a range of relative rotational positions of the arm 12 and structure 14.

The collar 11 and arm 12 may be formed from any suitable materials, and need not be formed from the same material. Suitable materials for forming the collar 11 and the arm 12 include metals and plastics materials. The particular material(s) chosen for a given application will depend on the specific requirements of that application (e.g. weight, strength, cost and the like). The collar 11 and arm 12 may be manufactured using any techniques suitable for producing the desired configuration. The collar 11 and arm 12 need not be manufactured using the same technique. In some examples one or both of the collar 11 and the arm 12 is manufactured using an additive manufacturing process. An additive manufacturing process may be especially suitable for producing engagement surfaces having a large finite order of rotational symmetry, such as engagement surfaces having a large number of closely-spaced projections and/or recesses.

Figure 3:
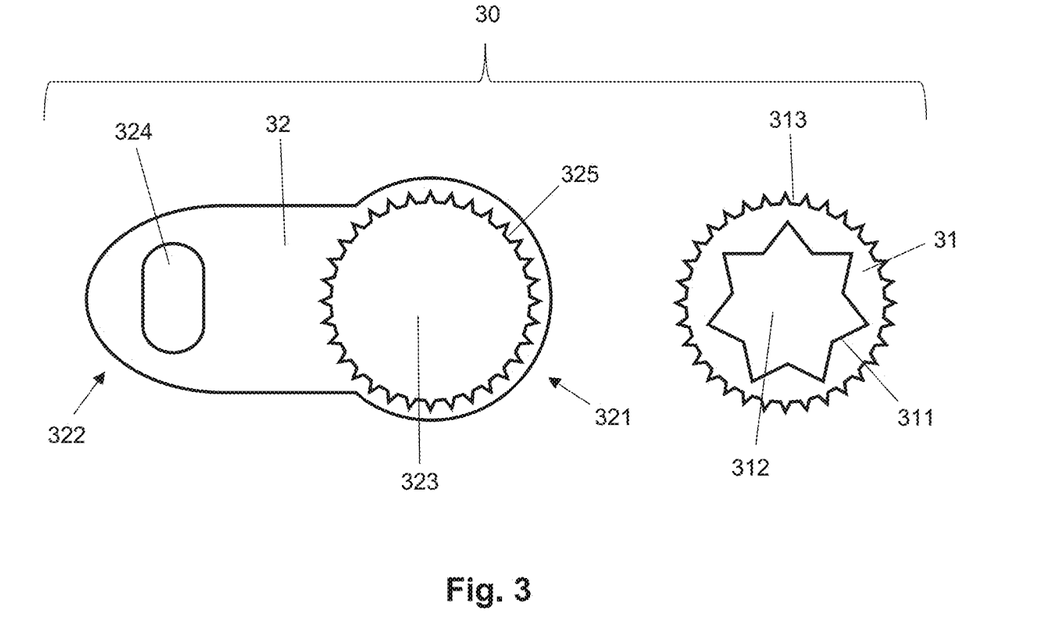
FIG. 3 is a top view of an example kit of parts for forming a locking apparatus according to the invention.

FIG. 3a shows a top view of an example kit of parts for forming a locking apparatus 30 according to the invention. The locking apparatus 30 comprises a collar 31 and a rigid arm 32, which have substantially the same features as the example collar 11 and arm 12, respectively, of FIG. 1. The collar 31 has an outer surface 313 comprising a plurality of radially-extending projections. There are 32 such projections, so the order of symmetry of the outer surface 313 is 32. The collar 31 has a star-shaped inner surface 311 which has an order of rotational symmetry of 7, for engaging with a rotatable fastener component having a corresponding star-shaped profile.

The arm 32 is substantially planar and has a first end 321 for engaging with the collar 31 and a second end 322 for engaging with a structure. The first end 321 comprises a first opening 323 configured to encircle the collar 31. An inner surface 325 of the opening 323 has a finite order of rotational symmetry the same as the outer surface 313 of the collar 31. The configuration of the inner surface 325 conforms to the outer surface 313 of the collar 31. That is, the inner surface 325 comprises 32 radially-extending recesses shaped to receive the radially-extending projections of the outer surface 313. When the first end 321 is engaged with the collar 31, the collar 31 is received within the first opening 323 and each of the projections on the outer surface 313 is received within a corresponding recess on the inner surface 325. A mechanical interlock between the inner surface 325 and the outer surface 313 is thereby created such that relative rotation of the arm 32 and collar 31 is substantially prevented.

The second end 322 of the arm 32 comprises a second opening 324 in the form of a slot. In the illustrated example the slot is straight, however it could be arcuate. The slot 324 is configured to facilitate engagement of the second end 322 with a structure, such that relative rotational movement of the arm 32 and the structure is constrained or substantially prevented. In this example the slot 324 is configured to engage with an engagement feature which may comprise a protrusion extending from a surface of the structure (such as the engagement feature 15 of FIG. 1), or may comprise a fastener which extends through the slot 324 and through a corresponding opening provided in the structure. The slot 324 is configured to receive such an engagement feature. In particular, the width of the slot is substantially equal to or slightly larger than a diameter of the engagement feature, and the length of the slot is significantly larger than the diameter of the engagement feature. The length of the slot may be selected in dependence on the number of rotational positions in which it is possible to engage the arm 12 with the collar 11, and/or the angular displacement between adjacent rotational positions in which it is possible to engage the arm 12 with the collar 11. When an engagement feature of a structure is received within the slot 324, rotational movement of the arm 32 relative to the structure is constrained to a maximum angular displacement corresponding to the length of the slot 234.

FIGS. 4*a*-*d* relate to example locking assemblies according to the invention. Each example locking assembly comprises a rigid base plate configured to extend between at least a first fastener and a second fastener, and a locking apparatus according to the invention (e.g. the example locking apparatus 10 or the example locking apparatus 30). The base plate provides a structure for the second end of the locking apparatus arm to engage with. It may therefore be advantageous to use a locking assembly according to the invention for applications where a suitable structure for the second end of the locking apparatus arm to engage with is not already present in the environment of the fastener that is to be locked.

Figure 4A:
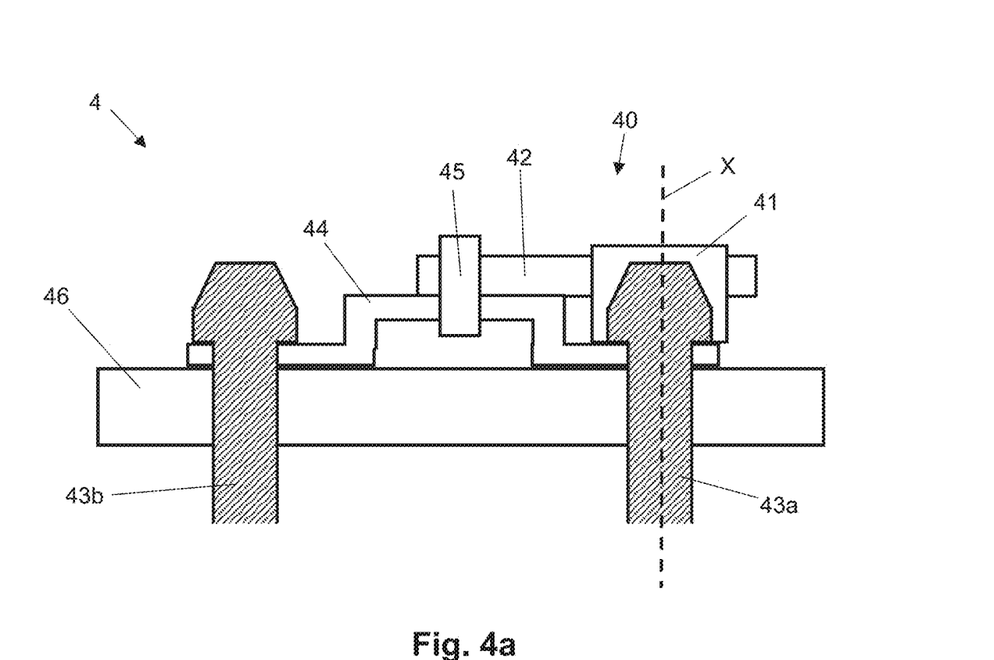
FIG. 4a is a cross-section through a further example assembly according to the invention.

FIG. 4*a* is a cross-section through a first example locking assembly 4, installed on two fasteners 43*a*, 43*b*, which are in turn installed on a structure 46. FIG. 4*c* is a top view of the first example locking assembly 4 (the structure 46 is omitted from this view). The locking assembly 4 comprises a rigid base plate 44 which extends between a first fastener 43*a* and a second fastener 43*b*. The rotational position of a rotatable component of the first fastener 43*a* is locked by the locking assembly 4. The locking assembly 4 further comprises a locking apparatus 40. The locking apparatus 40 comprises a collar 41 and an arm 42. The arm 42 has substantially the same features as the example arm 32 of FIG. 3. The collar 41 is substantially the same as the example collar 31 of FIG. 3, except that the collar 41 is in the form of a cap rather than a sleeve—that is the collar 41 does not have a top opening through which the top of the fastener 43*a* can be accessed. A sleeve-type collar could equally be used in the locking apparatus 40.

Figure 4B:
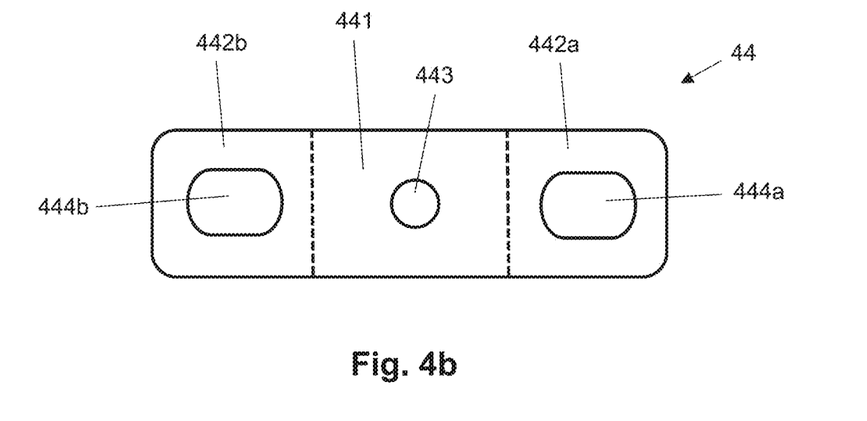
Figure 4C:
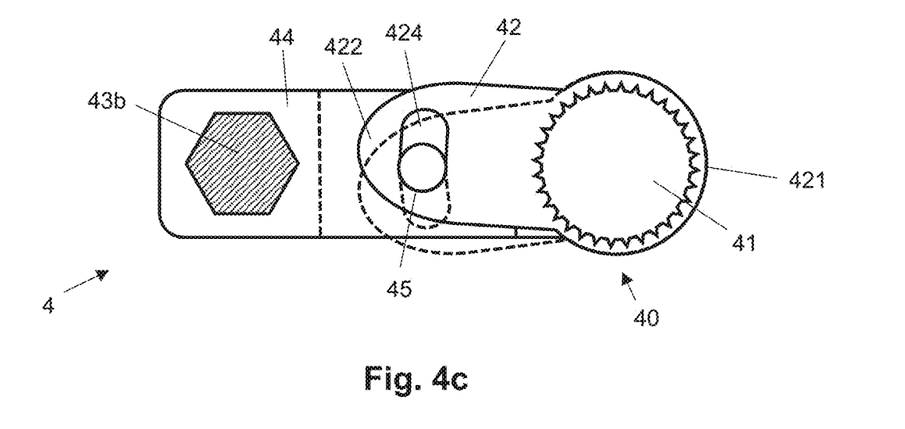

FIG. 4*b* is a top view of the base plate 44 in isolation from the other components of the locking assembly 4. The base plate 44 has a first part 442*a* configured to engage with first fastener 43*a* such that relative translational movement of the first part and the first fastener 43*a* is constrained, and a second part 442*b* configured to engage with the second fastener 43*b* such that relative translational movement of the second part and the second fastener 43*b* is constrained. In the illustrated example the base plate 44 comprises a rigid arm having a relatively raised centre section 441 between a pair of relatively depressed end sections 442*a*, 442*b*. The base plate 44 is monolithic, although that need not be the case in all examples. Each end section 442*a*, 442*b* comprises an opening 444*a*, 444*b* configured to encircle a part of the first fastener 43*a* and a part of the second fastener 43*b* respectively. The openings 444*a*, 444*b* may be larger than the diameters of the fastener parts which they are intended to encircle, so that engagement of the base plate 44 with the first and second fasteners 43*a*, 43*b* is not hindered by manufacturing tolerances. In the illustrated example, each opening 444*a*, 444*b* comprises a slot oriented parallel to the long axis of the base plate 44.

The base plate 44 may be formed from any suitable material, using any known manufacturing technique. For example, the base plate may be stamped from sheet metal. The particular material and manufacturing technique chosen for a given application will depend on the specific requirements of that application (e.g. weight, strength, cost and the like). The base plate 44 is monolithic, although that need not be the case in all examples.

The centre section 441 of the base plate 44 comprises a fastener hole 43. The fastener hole 43 is configured to receive a locking fastener 45, which functions as an engagement feature to facilitate engagement of the second end of the arm 42 with the base plate 44. In some examples the centre section 441 may additionally comprise a captive nut, to facilitate installation of the locking fastener 45. In some examples the locking fastener 45 clamps the second end of the arm 42 against the base plate 44, to substantially prevent relative movement therebetween.

The base plate 44 is engaged with the first and second fasteners 43*a*, 43*b* at the time of installing the fasteners 43*a*, 43*b* on the structure 46. The fasteners 43*a*, 43*b* clamp the base plate 44 against the structure 46, so that it is held in fixed relation to the fasteners 43*a*, 43*b* and the structure 46, even though some relative movement may otherwise have been permitted by the engagement of the openings 444*a*, 444*b* with the parts of the fasteners 43*a*, 43*b* received therein.

The arm 42 is engageable with the collar 41 in a plurality of discrete rotational positions. In this example the number of discrete rotational positions in which the arm 42 is engageable with the collar 41 is the same as the order of symmetry of the outer surface of the collar (and the inner surface of the first end 421 of the arm 42). However; the second end 422 of the arm is only engageable with the base plate 44 in a subset of those rotational positions. In particular, the second end 422 of the arm is only engageable with the base plate 44 in rotational positions in which the slot 424 is aligned with the engagement feature 45. The slot 424 is sized to permit engagement of the arm 42 with the base plate 44 in at least two adjacent possible engagement positions of the arm 42 and collar 41.

FIG. 4*c* shows two alternative engaged positions of the arm 42. In the first engaged position (indicated by solid lines) the arm 42 is rotated clockwise relative to the second engaged position (indicated by dashed lines). In each of the first and second engaged positions, the first end 421 of the arm 42 is engaged with the collar 41 such that rotational movement of the arm 42 relative to the collar 41 is substantially prevented, and the second end 422 of the arm 42 is engaged with the engagement feature 45 such that rotational movement of the arm 42 relative to the base plate 44 is substantially prevented. The first engaged position represents the maximum clockwise deviation (from a nominal position in which the engagement feature 45 is central in the slot 424) that is permitted by the slot 424, and second engaged position represents the maximum anti-clockwise deviation from the nominal position that is permitted by the slot 424. It will be appreciated that a longer slot would permit greater deviations. The angular separation between the first engaged position and the second engaged position is equal to the angular separation between adjacent splines on the outer surface of the collar 41 (and the angular separation between adjacent recesses on the inner surface of the first end 421 of the arm 42).

In the particular example of FIGS. 3a and 3b, the first end 421 of the arm 42 can be engaged with the collar 41 in thirty-two different relative rotational positions of the first end 421 and the collar 41. These rotational positions are approximately 11° apart. Thus, if the first end 421 is engageable with the collar 41 in a given relative rotational position of the collar 41 and the arm 42, the first end 421 will also be engageable with the collar 41 if the arm 42 is rotated by 11° clockwise or anti-clockwise relative to the collar 41. The angular separation between adjacent possible engagement positions of the arm 42 and the collar 41 will get smaller as the number of rotational positions in which the first end 421 is engageable with the collar 41 increases, and this number in turn increases with the order of rotational symmetry of the outer surface of the collar 41. A relatively high order of rotational symmetry of the collar 41 is therefore desirable.

The slot 424 provides a mechanism by which the second end of the arm 42 is able to be engaged with the base plate 44 in multiple relative orientations of the arm 42 and the base plate 44. It is desirable for the second end of the arm 42 to be engageable with the base plate 44 in multiple relative rotational positions of the arm 42 and base plate 44, for the following reasons. When the fastener 43a is tightened by rotating the rotatable component with which the collar 41 is to be engaged, the rotatable component may end up in any possible rotational position relative to the base plate 44 (and it will generally be impossible to predict or control the rotational position of the rotatable fastener component after tightening). However, the number of rotational positions in which the first end of the arm 42 can be engaged with the collar 41 is limited, due to the fact that the collar 41 has a finite order of rotational symmetry.

The second end 422 of the arm 42 is engageable with the engagement feature 45 of the base plate 44 in a range of rotational positions of the arm 42 relative to the base plate 44, between the first engaged position and the second engaged position shown in FIG. 4c. The size of this "second end engagement range" is determined by the length of the slot 424, as mentioned above. The size of the second end engagement range may be at least equal to the angular separation between consecutive rotational positions of the arm 42 in which the first end 421 is engageable with the collar 41. In the illustrated example, the first and second engaged positions of FIG. 4c are separated by 11.25°, so the size of the second end engagement range is 11.25°.

Depending on the nature of the engagement between the second end 422 and the base plate 44, the second end 422 and the base plate 44 may be engageable in any relative rotational position falling within the second end engagement range, or may be engageable only in discrete relative rotational positions falling within the second end engagement range. In the illustrated example, the second end 422 and the base plate 44 are engageable in any relative rotational position falling within the second end engagement range.

Considerations relating to the engagement of the second end 422 of the arm 42 with the base plate 44 described above equally apply to the engagement of a second end of an arm of a locking apparatus according to the invention with any structure, including the structure 14 of FIG. 1.

Figure 4D:
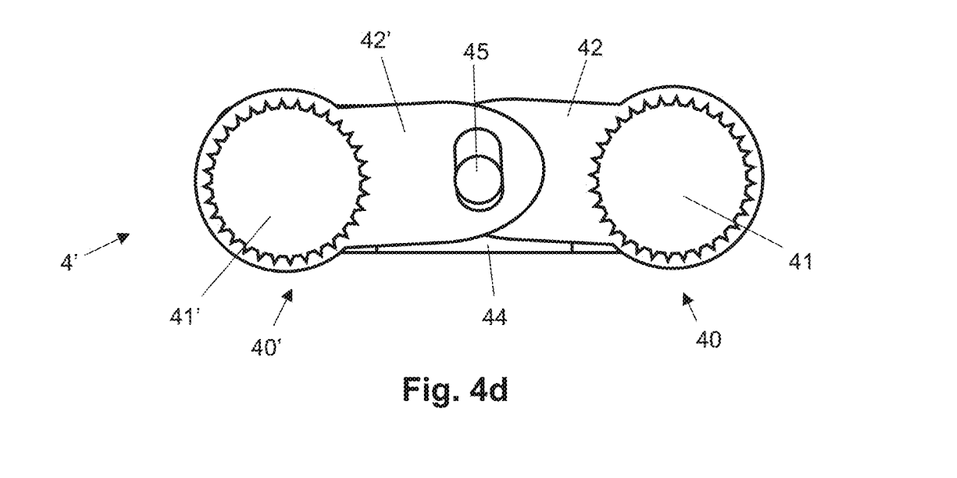
FIG. 4d is a top view of a further example locking assembly according to the invention.

For some applications it may be desired to lock rotatable components comprised in two adjacent fasteners. FIG. 4d shows a second example locking assembly 4' suitable for locking rotatable components of two adjacent fasteners. The locking assembly 4' is locking the rotational position of a rotatable component of the first fastener 43a and is also locking the rotational position of a rotatable component of the second fastener 43b. In the illustrated example the second fastener 43b is of the same design as the first fastener 43a, although that need not be the case in other examples.

The locking assembly 4' comprises the base plate 44, the locking apparatus 40, and also an additional locking apparatus 40'. The additional locking apparatus 40' comprises a collar 41' and an arm 42', which have may the same features as the collar and arm of the example locking apparatus 10 or the example locking apparatus 30 described above. In the illustrated example, the additional locking apparatus 40' is substantially identical to the locking apparatus 40, although that need not be the case in other examples. For example, the configuration of the arm and/or the collar may differ between the locking apparatus 40 and the additional locking apparatus 40'. It will be appreciated that where the locking apparatus 40 and the additional locking apparatus 40' are engaged with rotatable fastener components having differing designs, the configuration of the collars will differ in accordance with the differing designs of the rotatable fastener components.

The collar 41' of the additional locking apparatus 40 is engaged with the rotatable component of the second fastener 43b, so as to substantially prevent relative rotation of the collar 41' and rotatable component. The first end of the arm 42' is engaged with the collar 41' to substantially prevent relative rotation of the collar 41' and arm 42'. The second end of the arm 42' of the additional locking apparatus 40' is engaged with the base plate 44 to substantially prevent relative rotation of the arm 42' and base plate 44. In the illustrated example the second end of the arm 42 is engaged with the same engagement feature 45 on the base plate 44 as the second end 422 of the arm 42. In other examples, the second end of the arm 42' may be engaged with a different engagement feature on the base plate 44 to the second end 422 of the arm 42.

Figure 5A:
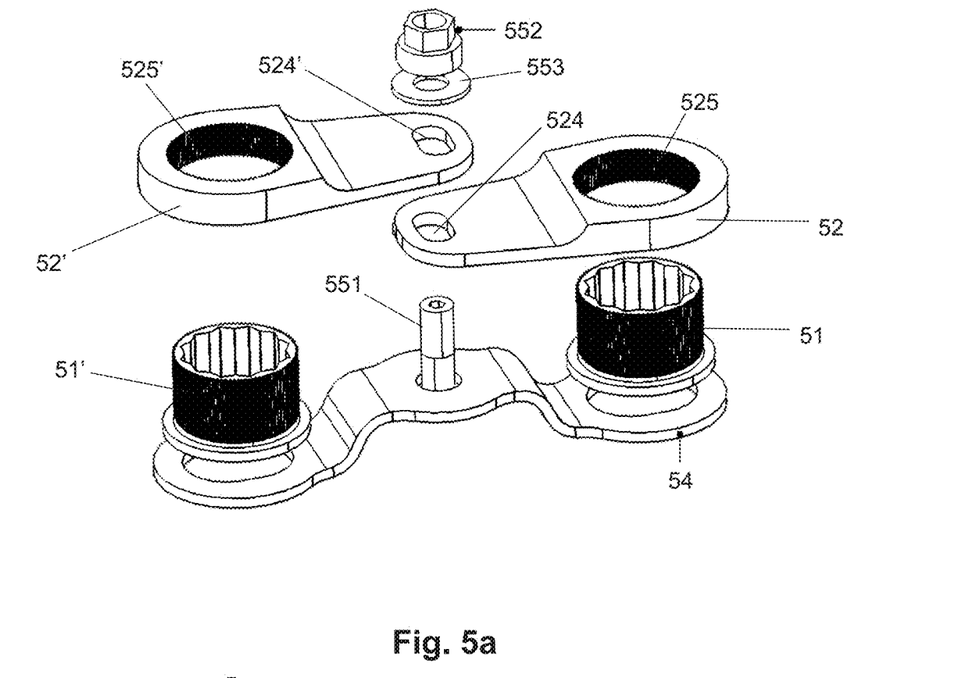
FIG. 5a is an exploded perspective view of an example locking assembly according to the invention.
Figure 5B:
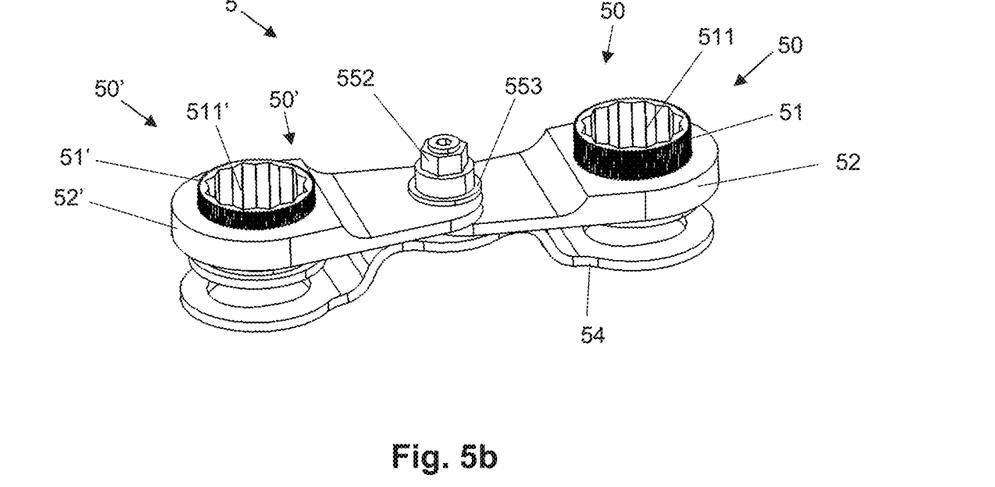
Figure 5C:
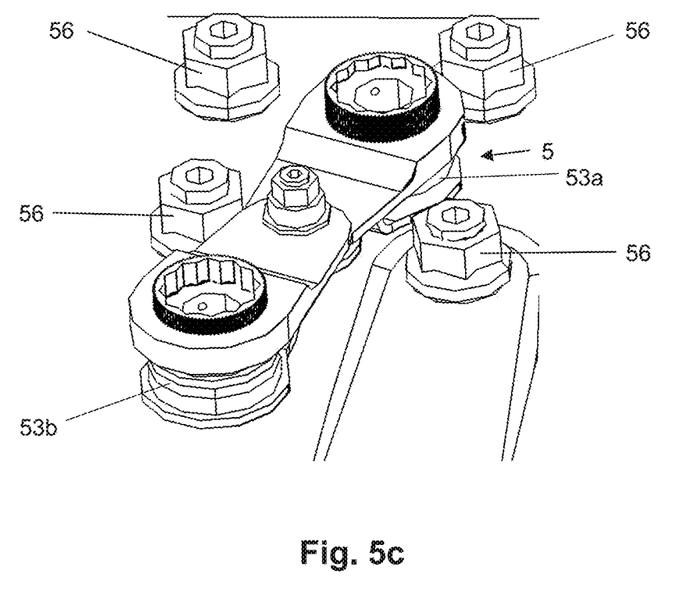
FIG. 5c is a perspective view of the example locking assembly of FIG. 5a installed on an aircraft structure.

FIGS. 5a-c relate to a particular example locking assembly 5 for locking the rotational position of rotatable components of two adjacent fasteners. FIG. 5a shows a kit of parts for forming the locking assembly 5, and FIG. 5b shows the locking assembly 5 in an operational configuration. FIG. 5c shows the locking assembly 5 in operation, locking the rotational position of nuts of two adjacent nut-and-bolt type fasteners.

The locking assembly 5 has the same general configuration as the example locking assembly 4' of FIG. 4d. It comprises a base plate 54 that is configured to engage with a pair of adjacent fasteners 53a, 53b; an engagement feature 551, a first locking apparatus 50 that is configured to lock a nut of the first fastener 53a; and a second locking apparatus 50' that is configured to lock a nut of the second fastener 53b. Each of the first and second locking apparatus 50, 50' comprises a collar 51, 51' and an arm 52, 52'. The nuts of the first and second fasteners 53a, 53b have the same configuration, so the collars 51, 51' are substantially identical. Each collar 51, 51' has an inner surface 511, 511' having rotational symmetry of order 12, which is configured to mechanically interlock with a nut of one of the fasteners 53a, 53b. Each collar 51, 51' has an outer surface having a large number of radially extending splines, and has an order of symmetry significantly greater than that of the inner surface. A first end of each arm 52, 52' has an inner surface 525, 525' which has a number of radially extending recesses equal to the number of splines on the outer surface of each collar 51, 51'. A second end of each arm 52, 52' has a slot 524, 524' configured to receive the engagement feature 551.

The engagement feature 551 comprises a post extending upwardly from a centre region of the base plate 54. The post is threaded so that a locking nut 552 can be engaged with the post to prevent relative movement of the arms 52, 52' and the base plate 54 in the axial direction of the post. In the illustrated example a washer 553 is disposed between the locking nut 552 and the uppermost arm 52'. The post 551 may be formed integrally with the base plate 54 or may be a separate component fixedly attached to the base plate 54. In some examples the post 551 is comprised in a fastener component, such as a stud or a bolt.

The collars 51, 51' are configured to engage with nuts of the fasteners 53a, 53b by encircling the nuts such that radial projections on the outer circumferential surface of the nuts are received within corresponding radial recesses on the inner surfaces 511, 511' of the collars 51, 51'. Similarly, the arms 52, 52' are configured to engage with the collars 51, 51' by encircling the collars such that the splines on the outer circumferential surface of the collars 51, 51' are received within corresponding radial recesses on the inner surfaces 525, 525' of the arms 52, 52'. In use of the locking assembly 5, a rotational position of each arm 52, 52' is selected such that the recesses of the surfaces 525, 525' align with and are able to receive the splines on the collars 51, 51', and also such that each slot 524 aligns with and is able to receive the engagement feature 551. The selected rotational position of each arm 52, 52' is contained within a second end engagement range of that arm, which for each arm 52, 52' is defined based on the angular separation of the splines on the corresponding collar 51, 51' and the length of the slot 524, 524' of that arm, as described above in relation to the example locking assembly 4.

It will be appreciated that when each locking apparatus 50, 50' is engaged with both a fastener nut and the engagement feature 551, rotation of each locking apparatus 50, 50' (and therefore of the nuts with which the locking apparatus are engaged) is permitted by an amount corresponding to the length of the slots 524, 524'. For some applications, it may be acceptable to lock a rotatable fastener component such that this degree of rotation of the fastener component (but no more) is permitted. In such examples it is not necessary to provide a mechanism to prevent relative movement of the second end of an arm and an engagement feature with which that second end is engaged. However; for other applications it may be desired for the locking apparatus or assembly to substantially prevent rotation of the rotatable component(s) being locked by that locking apparatus or assembly. The example locking assembly 5 is suitable for such an application.

In the operational configuration of the locking assembly 5, as shown in FIGS. 5b and 5c, the second end of each arm 52, 52' is prevented from moving relative to the base plate 54 by the locking nut 552, which (via threaded engagement of the locking nut 552 with the post 551) clamps together the second end of each arm 52, 52' and the base plate 54. The locking nut 552 is done up tight enough that friction between these parts is sufficient to substantially prevent relative rotation thereof. In other examples, other mechanisms for locking the relative rotational positions of the second end of each arm 52, 52' and the base plate 54 could be used instead of the locking nut 552.

FIG. 5c shows the surrounding environment of the locking assembly 5 when it is in use to lock the fasteners 53a and 53b. In the illustrated example, the fasteners 53a and 53b are used to fasten together two (or more) aircraft structures. The aircraft structures may, for example, include one or more structure comprised in a flap extension/retraction mechanism. There are various other fasteners 56 adjacent the fasteners 53a, 53b which are not locked. This may be, for example, because the fasteners 56 are less safety-critical than the fasteners 53a and 53b. In some examples the configuration of the base plate 54, arm 52, and/or the arm 52' may be tailored to fit the specific environment in which the locking assembly 5 is intended to be used. For example, cut-outs or the like may be provided in any or all of these components to accommodate other adjacent fasteners or structural features that would otherwise hinder installation of the locking assembly 5 on the fasteners 53a, 53b that are to be locked.

Figure 6:
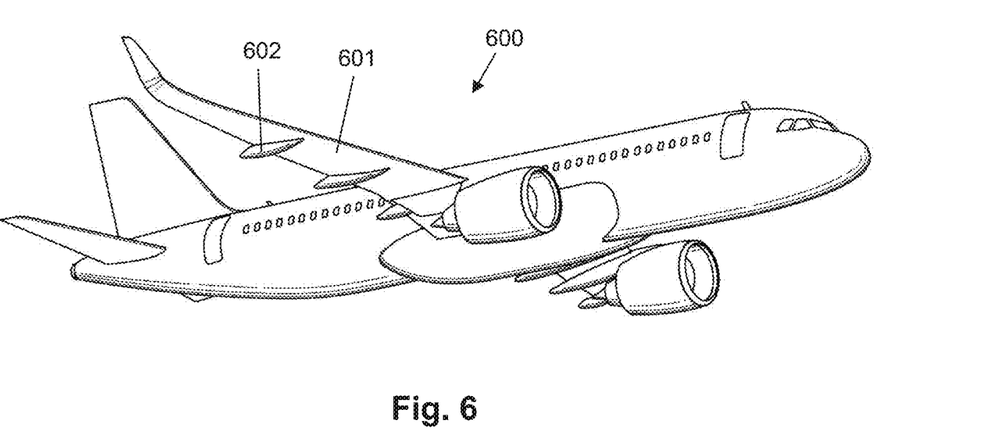
FIG. 6 is a schematic perspective view of an example aircraft comprising an assembly according to the invention.

Locking apparatus and assemblies according to the invention may advantageously be employed in the aerospace industry, e.g. to facilitate aircraft manufacture. FIG. 6 shows an example aircraft 500 which comprises one or more such locking apparatus or locking assemblies. In particular, the aircraft comprises a wing 601, which comprises flaps. Mechanisms for extending and retracting the flaps are housed in fairings 602. In each of these mechanisms, a flap track is attached to one or more structural components of the wing 601 (e.g. a spar and/or one or more ribs) by a plurality of fasteners, at least some of which are rotationally locked by a locking apparatus or locking assembly according to the invention. The attached structures, fasteners and locking apparatus or assembly together form an aircraft assembly according to the invention. The aircraft 600 also includes a further wing and having further flap mechanisms, which is substantially the same as the wing 601. The aircraft 600 may alternatively or additionally comprise locking apparatus and/or locking assemblies according to the invention in locations other than on the flap mechanisms.

Figure 7:
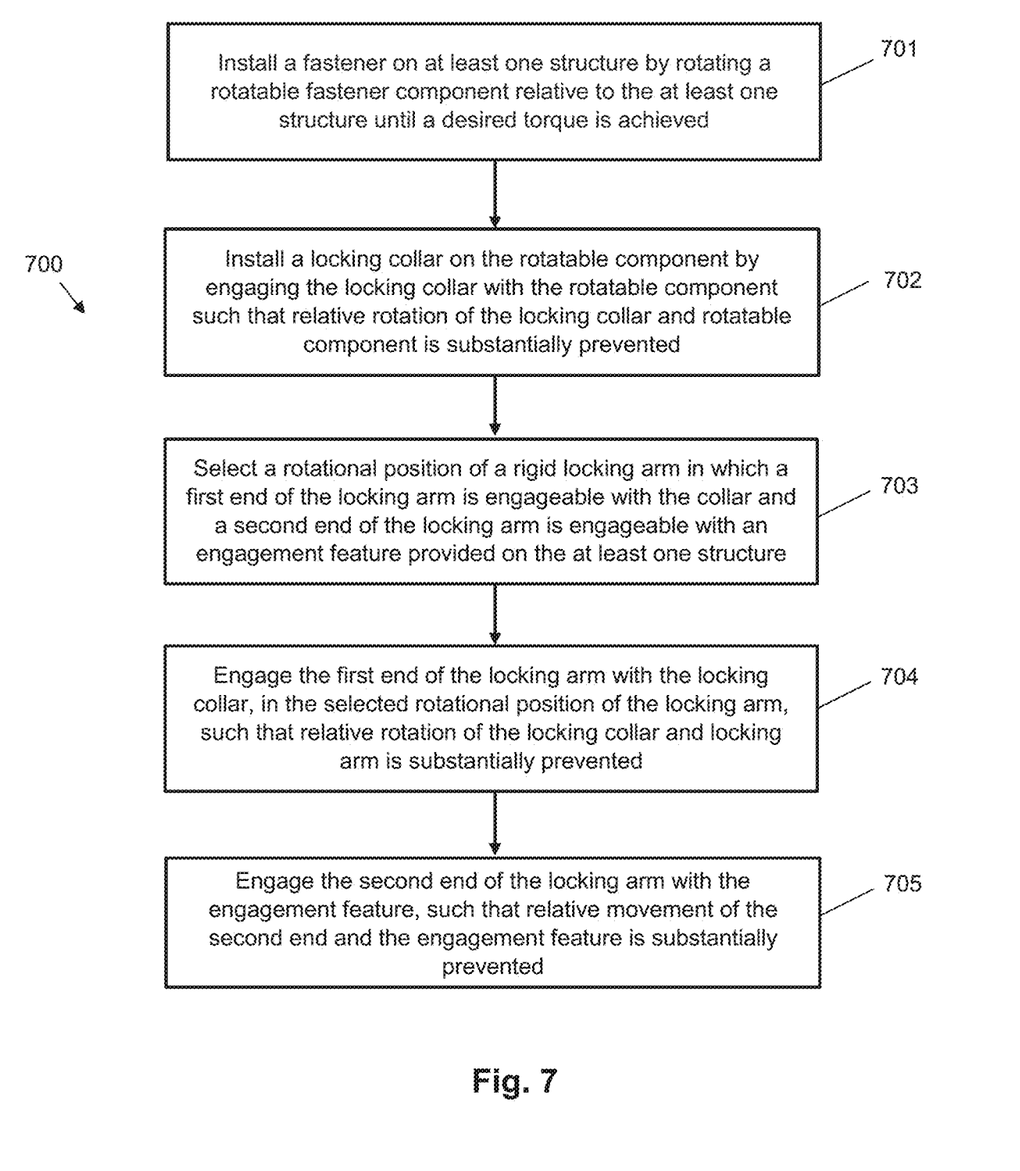
FIG. 7 is a flow chart illustrating an example method of locking the rotational position of a rotatable fastener component according to the invention.

FIG. 7 is a flow chart illustrating an example method 700 of locking the rotational position of a rotatable fastener component. The method 700 may be implemented using an example locking apparatus or locking assembly according to the invention, such as the example locking apparatus 10, the example locking assembly 4, or the example locking assembly 5 described above.

In the first block 701, a fastener is installed on at least one structure by rotating a rotatable fastener component relative to the at least one structure until a desired torque is achieved. The fastener may be preventing separation of the at least one structure and one or more further structures. The fastener may be any type of fastener which is installed by rotation of a component of that fastener, and may be installed in a conventional manner appropriate to the type of fastener. The desired torque may be predetermined, and may depend on the particular location and function of the fastener. The fastener may have the features of any of the example fasteners described above. The at least one structure may have the features of any of the example structures described above. The at least one structure (and if present, the further structure) may be comprised by or in an aircraft component.

In block 702, a locking collar is installed on the rotatable component by engaging the locking collar with the rotatable component such that relative rotation of the locking collar and rotatable component is substantially prevented. The locking collar may have the features of any of the example collars described above. The locking collar may be installed on the rotatable component by inserting the rotatable component into the locking collar such that the locking collar encircles the rotatable component. Such insertion may comprise translating the locking collar relative to the rotatable component along the axial direction of the locking collar. Installing the locking collar on the rotatable component may comprise engaging surface features of the rotatable component with surface features of the collar. For example, radial projections on an outer circumferential surface of the rotatable component may become received within corresponding radial recesses on an inner surface of the locking collar during the installation. Installing the locking collar on the rotatable component may comprise creating a mechanical interlock between an outer surface of the rotatable component and the inner surface of the locking collar.

In block 703, a rotational position of a rigid locking arm is selected. The locking arm may have the features of any of the example arms described above. The selected rotational position is a rotational position in which a first end of the locking arm is engageable with the locking collar and a second end of the locking arm is engageable with an engagement feature provided on the at least one structure. The engagement feature may have the features of any of the example engagement features 15, 45, 551 described above. The engagement feature may be integral with the at least one structure, or may be fixedly attached to the at least one structure. In some examples the engagement feature is comprised in a base plate that is fixedly attached to the at least one structure. Such a base plate may have the features of any of the example base plates 44, 54 described above. In some examples the method 700 additionally comprises providing a base plate on the at least one structure, which may be performed in any of the manners described above in relation to the example base plates 44, 54.

The first end of the locking arm and the locking collar may be mutually configured such that the first end of the locking arm is engageable with the rotatable component in a set of discrete rotational positions, and performing block 703 may comprise selecting a relative rotational position comprised in the set of discrete rotational positions. The engagement feature and the second end of the locking arm may be mutually configured such that the second end of the locking arm is engageable with the engagement feature in a range of rotational positions of the locking arm relative to the structure. Selecting a rotational position of the locking arm may comprise selecting a rotational position comprised in both the set of discrete rotational positions and the range of rotational positions. The range of relative rotational positions may comprise a subset of the set of discrete relative rotational positions. The range of relative rotational positions may comprise relative rotational positions in which the locking arm extends toward the engagement feature. The range of relative rotational positions may comprise relative rotational positions in which the second end (or a feature provided thereon, such as an opening) aligns with the engagement feature. The range of relative rotational positions may have the features of the second end engagement range described above in relation to the example locking assembly 4.

In block 704, the first end of the locking arm is engaged with the locking collar, in the selected rotational position of the locking arm, such that relative rotation of the locking collar and the locking arm is substantially prevented. Engaging the first end of the locking arm with the locking collar may be performed in a similar manner to engaging the locking collar with the rotatable component. In some examples, engaging the first end with the locking collar may comprise receiving at least a part of the locking collar within a recess or opening formed in the first end. The first end may be engaged with the locking collar by inserting the locking collar into an opening formed in the first end, such that the first end encircles the locking collar. Such insertion may comprise translating the locking arm relative to the locking collar along the axial direction of the locking collar. Engaging the first end with the locking collar may comprise engaging surface features of the locking arm with surface features of the locking collar. For example, radial projections on an outer circumferential surface of the locking collar may become received within corresponding radial recesses on an inner surface of an opening in the first end during the engaging. Engaging the first end on the locking collar may comprise creating a mechanical interlock between an outer surface of the locking collar and a surface of the second end.

In block 705, the second end of the locking arm is engaged with the engagement feature, such that relative rotation of the second end and the engagement feature is constrained or is substantially prevented. Engaging the second end of the locking arm with the engagement feature may be performed in any of the manners described above in relation to the example arms 12, 32, 42, 52. Engaging the second end of the locking arm with the engagement feature may comprise receiving at least part of the engagement feature within an opening provided in the second end. Engaging the second end of the locking arm with the engagement feature may comprise fixedly attaching the second end of the locking arm to the engagement feature, and/or to a further structure such as the locking arm of a further locking apparatus according to the invention, a base plate, and/or the at least one structure. Engaging the second end of the locking arm with the engagement feature may comprise installing a fastener component on the engagement feature.

It may be desired to lock the rotational position of a rotatable component of a further fastener that is intended to be located near to the fastener. In such cases the method 700 may be performed in respect of the fastener and in respect of the further fastener. The method 700 may be performed sequentially, simultaneously, or a combination of both sequentially and simultaneously, until the rotatable components of both the fastener and the further fastener have been locked. In some examples a single locking assembly (such as the example locking assembly 4 or the example locking assembly 5) may be used to lock the rotatable components of both the fastener and the further fastener. In such cases, the method 700 may be performed in respect of a first locking apparatus comprised in the locking assembly and the fastener, and also in respect of a second locking apparatus comprised in the locking assembly and the further fastener.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A locking assembly comprising:
   a rigid base plate configured to extend between at least a first fastener and a second fastener, the rigid base plate having a first part configured to engage with a first fastener such that relative translational movement of the first part and the first fastener is constrained, and a second part configured to engage with a second fastener such that relative translational movement of the second part and the second fastener is constrained; and a locking apparatus including:
- a collar configured to engage the first fastener to constrain rotation of the collar relative to the first fastener; and
- a rigid arm including a first end configured to engage the collar to constrain rotation of the collar relative to the first end, and a second end configured to engage the rigid base plate to constrain rotation of the rigid arm relative to the rigid base plate;
- wherein the collar includes an inner surface having a first finite order of rotational symmetry about an axis of the first fastener, and an outer surface having a second, larger, finite order of rotational symmetry about the axis, and
- wherein the second end of the rigid arm is configured to engage the rigid base plate to constrain rotation of the rigid arm relative to the base plate;

wherein the locking assembly is configured to lock a rotational position of the first fastener and a rotational position of the second fastener, each of which is rotatable about a respective axis relative to a structure receiving the first and second fasteners;

wherein the locking apparatus is configured to lock the rotational position of the first fastener relative to the rigid base plate;

wherein the locking assembly further comprises an additional locking apparatus configured to lock the rotational position of the second fastener relative to the rigid base plate, wherein the second end of the arm of the locking apparatus and a second end of an arm of the additional locking apparatus are each engageable with a common engagement feature of the base plate, and wherein the common engagement feature comprises a fastener configured to extend through the rigid base plate, the second end of the arm of the locking apparatus, and the second end of the arm of the additional locking apparatus.

2. The locking assembly according to claim 1, wherein the inner surface of the collar is configured to mechanically interlock with an outer surface of the first fastener.

3. The locking assembly according to claim 2, wherein the inner surface of the collar is configured to mechanically interlock with the outer surface of the first fastener in a plurality of rotational positions of the first fastener relative to the collar.

4. The locking assembly according to claim 2, wherein the first end of the rigid arm comprises an engagement surface configured to mechanically interlock with the outer surface of the collar in a plurality of rotational positions of the rigid arm relative to the collar.

5. The locking assembly according to claim 4, wherein the plurality of rotational positions of the rigid arm relative to the collar is greater than the plurality of rotational positions of the collar relative to the first fastener.

6. The locking assembly according to claim 1, wherein at least a section of the collar has a non-circular cross-section and/or at least one radially-extending projection, and wherein the first end of the rigid arm is configured to at least partially encircle the at least a section of the collar having a non-circular cross-section and/or at least one radially-extending projection.

7. The locking assembly according to claim 6, wherein one of the engagement surface of the first end and the outer surface of the collar comprises axial splines oriented substantially parallel to the axis of rotation of the fastener component, which project radially from the surface with respect to the axis of rotation of the fastener component, and the other one of the engagement surface of the first end and the outer surface of the collar comprises axial recesses configured to receive the splines, so that the splines and the recesses interlock to prevent relative rotation of the arm and the collar when the arm is engaged with the collar.

8. The locking assembly according to claim 1, wherein the second end of the rigid arm is configured to be fixedly attachable to the rigid base plate in a plurality of rotational positions of the rigid arm relative to the rigid base plate.

9. The locking assembly according to claim 1, wherein one or both of the collar and the rigid arm has been manufactured using an additive manufacturing process.

10. The locking assembly according to claim 1, wherein the first part of the base plate comprises a first opening configured to encircle the first fastener and the second part of the base plate comprises a second opening configured to encircle the second fastener.

11. The locking assembly according to claim 1, wherein the base plate further comprises an engagement feature configured to be engageable with the second end of the arm such that relative rotational movement of the second end and the base plate is substantially prevented.

12. A kit of parts for forming the locking assembly according to claim 1.

13. The locking assembly according to claim 1, wherein the first fastener and the second fastener each comprise a nut threadingly engaged with a bolt or a stud, and wherein the locking mechanism is engaged with the nut of the at least one of the first fastener or the second fastener to substantially prevent rotation of the nut relative to the first structure or the second structure.

14. An aircraft comprising the locking assembly according to claim 1.

* * * * *